United States Patent
Brines et al.

(10) Patent No.: US 10,232,755 B2
(45) Date of Patent: Mar. 19, 2019

(54) SEAT ASSEMBLY WITH ADJUSTABLE HEIGHT

(71) Applicant: Lear Corporation, Southfield, MI (US)

(72) Inventors: Eric Brines, White Lake, MI (US); William Webster, Davison, MI (US)

(73) Assignee: LEAR CORPORATION, Southfield, MI (US)

( * ) Notice: Subject to any disclaimer, the term of this patent is extended or adjusted under 35 U.S.C. 154(b) by 6 days.

(21) Appl. No.: 15/610,061

(22) Filed: May 31, 2017

(65) Prior Publication Data

US 2018/0043802 A1    Feb. 15, 2018

Related U.S. Application Data

(60) Provisional application No. 62/375,069, filed on Aug. 15, 2016.

(51) Int. Cl.
  *B60N 2/02*   (2006.01)
  *B60N 2/90*   (2018.01)
(52) U.S. Cl.
  CPC .............. *B60N 2/914* (2018.02); *B60N 2/02* (2013.01)
(58) Field of Classification Search
  CPC .................................. B60N 2/914; B60N 2/02
  USPC .................................... 297/338, 340, 344.12
  See application file for complete search history.

(56) References Cited

U.S. PATENT DOCUMENTS

| | | | |
|---|---|---|---|
| 5,882,075 A | 3/1999 | Partington et al. | |
| 6,076,619 A * | 6/2000 | Hammer | A61G 5/04 180/6.48 |
| 7,909,404 B2 | 3/2011 | Spangler, Jr. | |
| 2002/0108180 A1 * | 8/2002 | Odderson | A47C 4/54 5/654 |
| 2013/0285426 A1 * | 10/2013 | Arant | B60N 2/62 297/284.1 |
| 2015/0210192 A1 | 7/2015 | Benson et al. | |
| 2015/0351692 A1 | 12/2015 | Pereny et al. | |
| 2015/0352979 A1 | 12/2015 | O'Bannon et al. | |
| 2015/0352990 A1 | 12/2015 | Zouzal et al. | |
| 2016/0227932 A1 | 8/2016 | Bortolon et al. | |
| 2016/0347206 A1 * | 12/2016 | Line | B60N 2/7064 |
| 2017/0164747 A1 * | 6/2017 | Zouzal | A47C 7/14 |

FOREIGN PATENT DOCUMENTS

| | | |
|---|---|---|
| DE | 102005034069 A1 | 1/2007 |
| EP | 1162108 A1 | 12/2001 |
| FR | 2899160 A1 | 10/2007 |

* cited by examiner

*Primary Examiner* — Mark R Wendell
(74) *Attorney, Agent, or Firm* — Brooks Kushman P.C.

(57) ABSTRACT

A seat assembly is provided with a seat bottom having a seat frame. An air bladder is mounted to the frame. A seat cushion is spaced vertically from the seat frame by the air bladder at height-adjustment distance being variable. The cushion defines a seating surface. A height-adjustment distance between the frame and the seating surface is increased as the air bladder is inflated, thereby adjusting a height of the seating surface without adjusting the frame.

20 Claims, 3 Drawing Sheets

SEAT ASSEMBLY WITH ADJUSTABLE HEIGHT

CROSS-REFERENCE TO RELATED APPLICATIONS

This application claims the benefit of U.S. provisional application Ser. No. 62/375,069 filed Aug. 15, 2016, the disclosure of which is hereby incorporated in its entirety by reference herein.

TECHNICAL FIELD

The present disclosure relates to a seat assembly having a height adjustment assembly.

BACKGROUND

An adjustable seat assembly is illustrated and described in U.S. Patent Publication No. US 2015/0352990 by Lear Corporation, which published on Dec. 10, 2015.

SUMMARY

According to at least one embodiment, a height adjustment assembly for a seat is provided. The height adjustment assembly includes a seat frame and a seat cushion spaced vertically from the seat frame, the cushion defining a seating surface. An air bladder is mounted to the frame. As the air bladder is inflated, a distance between the frame is adjusted, thereby adjusting a height of the seating surface.

According to at least one embodiment, a seat assembly is provided with a seat back pivotally attached to a seat bottom. The seat bottom includes a seat frame and a seat cushion spaced vertically from the seat frame, the cushion defining a seating surface. An air bladder is mounted to the frame. As the air bladder is inflated, a distance between the frame is adjusted, thereby adjusting a height of the seating surface without adjusting the frame.

According to at least one embodiment, a seat assembly is provided with a seat bottom having a seat frame. An air bladder is mounted to the frame. A seat cushion is spaced vertically from the seat frame by the air bladder at height-adjustment distance being variable. The cushion defines a seating surface. A height-adjustment distance between the frame and the seating surface is increased as the air bladder is inflated, thereby adjusting a height of the seating surface without adjusting the frame.

According to another embodiment, a rigid reaction plate is positioned between the air bladder and the seat cushion. The reaction plate is displaced the height-adjustment distance as the air bladder is inflated.

According to another embodiment, the reaction plate extends a length distance being generally equal to a length of the cushion.

According to another embodiment, the reaction plate is integrally formed along a lower surface of the cushion.

According to another embodiment, the air bladder extends the length distance.

According to another embodiment, the cushion is moved away from the frame by the height-adjustment distance along a length of the cushion extending from a forward edge to a rearward edge.

According to another embodiment, the air bladder has a wedge shape such that a first portion of the bladder adjacent the rearward edge of the cushion inflates the height-adjustment distance and a second portion of the bladder inflates a second distance being less than the height-adjustment distance.

According to another embodiment, the height-adjustment distance varies by at least twenty millimeters.

According to another embodiment, the height-adjustment distance extends in the range of twenty-five to fifty millimeters.

According to another embodiment, the seat assembly includes a seat back pivotally attached to the seat bottom, wherein the seat back is moved with the seat cushion by the adjustment distance when the air bladder is inflated.

According to at least one embodiment, a height adjustment assembly for a seat is provided. The height adjustment assembly has an air bladder for mounting to a seat frame along a bottom surface. A rigid reaction plate is positioned along a top surface of the air bladder for mounting along a seat cushion. The reaction plate is displaced an adjustment distance between the bottom surface and the top surface as the air bladder is inflated.

According to another embodiment, the reaction plate is welded to the top surface of the air bladder.

According to another embodiment, the air bladder comprises a multi-stage bladder having multiple chambers in fluid communication for varying the adjustment distance.

According to at least one embodiment, a seat assembly is provided having a seat frame and an air bladder mounted to the frame along a lower surface. A seat cushion is positioned on the air bladder along a lower reaction surface being generally rigid. The cushion defines a seating surface opposite the reaction surface. An adjustment distance between the frame and reaction surface is increased as the air bladder is inflated, thereby adjusting the position of the seating surface without adjusting the frame.

According to another embodiment, the seat assembly has a compressor in fluid communication with the air bladder. A controller is in electrical communication with the compressor and programmed to inflate and deflate the air bladder based on a signal to change the position of the seating surface.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
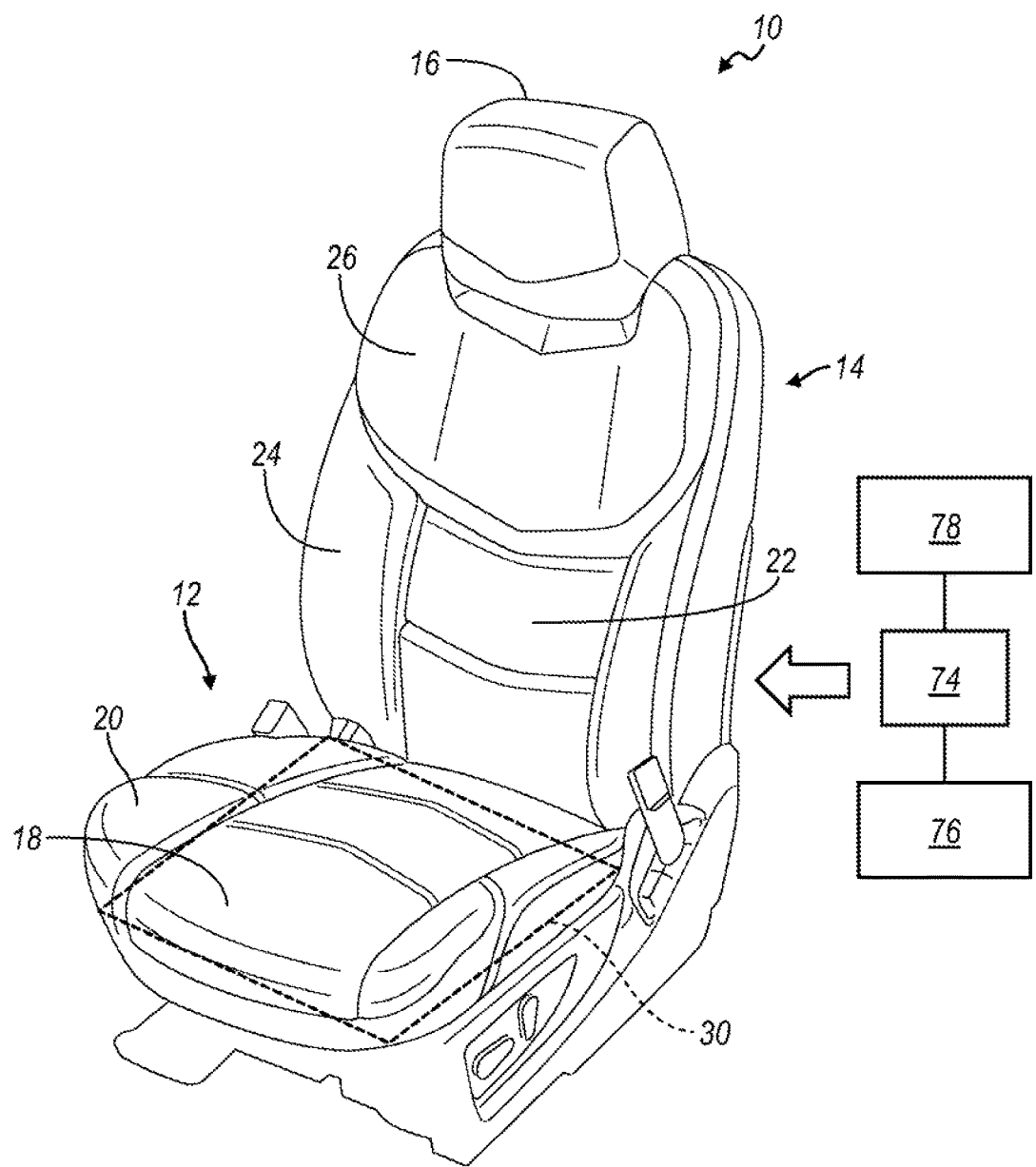
FIG. 1 is a front perspective view of a seat assembly according to an embodiment.

FIG. 1 illustrates a seat assembly 10 according to an embodiment. The seat assembly 10 may be utilized as a vehicle seat assembly 10 for seating in a vehicle, such as an automobile, an aircraft, a watercraft, or the like. Of course, the seat assembly 10 may be utilized in any seating environment that may benefit from an adjustable seat assembly 10.

The seat assembly 10 includes a seat bottom 12, which may be adapted to be mounted for manual or motor-driven adjustable translation in a fore and aft direction and in an up and down direction of a vehicle. The seat assembly 10 includes a seat back 14, which may be pivotally connected to the seat bottom 12 to extend generally upright relative to the seat bottom 12 for manual or motor-driven pivotal adjustment relative to the seat bottom 12. A head restraint 16 may also be mounted for manual or motor-driven adjustable translation to the seat back 14.

The seat bottom 12 includes a central seating surface 18 and a seating surface along a pair of side bolster regions 20 laterally spaced about the central seating surface 18. The seat back 14 includes a seating surface having a pelvic/lumbar seating surface 22 with a pair of laterally spaced apart side bolster regions 24 on either side. A thoracic/shoulder seating surface 26 is provided above the pelvic/lumbar seating surface 22 and the seating surface of seat back side bolster regions 24.

Figure 2:
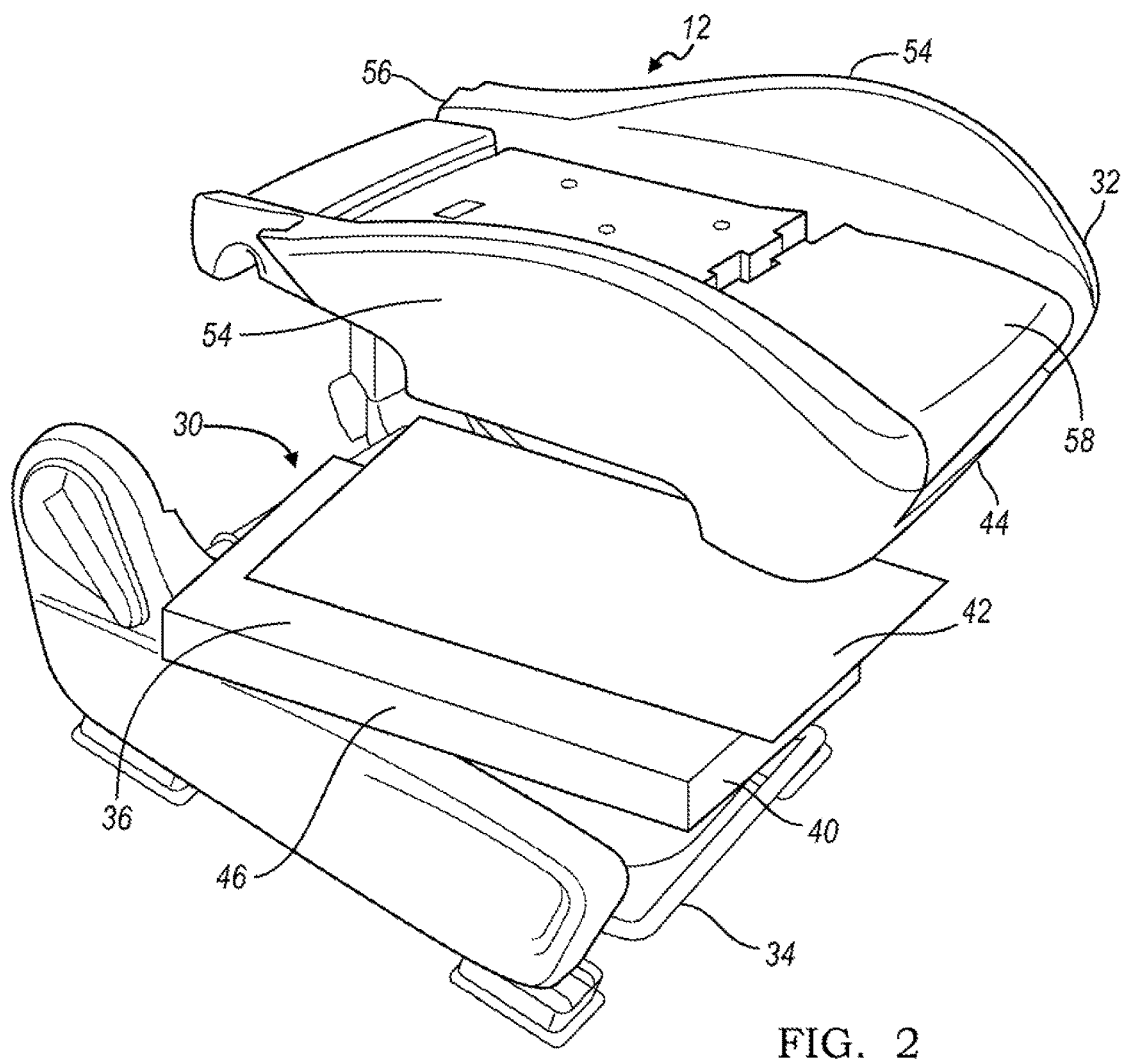
FIG. 2 is an exploded perspective view of the seat bottom of the seat assembly of FIG. 1, according to an embodiment.

FIG. 2 illustrates an exploded view of the seat bottom 12 with a cover removed for revealing the underlying components. The seat bottom 12 includes a height adjustment bladder assembly 30 positioned under the cushion 32. The height adjustment bladder assembly 30 is supported upon a frame 34 of the seat bottom 12. The height adjustment bladder assembly 30 may be supported upon a suspension 36 connected to the seat bottom frame 34. The height adjustment bladder assembly 30 allows positioning of the cushion 32 in the upright direction separate from adjustment of the frame 34.

The height adjustment bladder assembly 30 provides height adjustment of the seated occupant to position the occupant correctly for safety and visibility. In order to adjust the seat assembly in the vertical direction, traditionally, seat required adjustment mechanisms with linkages and motors that are heavy and take up space in the vehicle. In some applications, packaging such height adjustment mechanisms is not possible. For example, in some sport seat applications with low volume and weight requirements, it is not possible to include height adjustment mechanisms that are bulky and heavy. Yet, correctly positioning the occupant's h-point, or hip-point, remains a concern to ensure driver visibility and that seat belts and air bags are correctly positioned relative to the occupant, for example.

The height adjustment bladder assembly 30 includes a pneumatic actuated air bladder 40 and a rigid reaction plate 42. Actuation of the air bladder 40 moves the reaction plate 42 as the air bladder expands. The reaction plate 42 and air bladder distribute the lifting force of the air bladder along the entire length and width without substantially compressing the cushion 32. As a result, as the air bladder 30 inflates, the reaction plate 42 moves the cushion 32 in the upright direction to allow height adjustment of the seating surface 18 along the entire length and width of the cushion 32. The reaction plate 42 may be formed of plastic and have a thickness of at least 3 mm to provide rigidity and distribute the lifting force. The reaction plate may be formed of any suitable material that provides rigidity to distribute the lifting force along the length and width of the cushion 32.

Bladder or support systems in vehicle seats that provide comport and support, such as lumbar support, for example, typically change the firmness of the cushion along region of the seat when inflated or moved to a comfort position. In contrast, the height adjustment bladder assembly 30 does not change the support firmness of the cushion and seat, and provides a constant level of comfort and support while changing the height of the seating surface.

The reaction plate 42 may be welded to the air bladder 40. The reaction plate 42 may be welded to the air bladder 40 by any suitable plastic welding method such as, sonic welding, heat staking or other known welding methods. The reaction plate 42 may be welded to the air bladder along a welded seam on the bladder 40. The reaction plate 42 and weld seam may be welded in the same process or formed as separate process. In another embodiment, the reaction plate 42 may be positioned between the cushion 32 and the air bladder 40, but is not fixed to the air bladder 40. In another embodiment, the reaction plate 42 may be integrally formed with the cushion 32 along a reaction surface 44. The reaction surface 44 of the cushion 32 is opposite the seating surface 18.

The height adjustment bladder assembly 30 provides at least 25 mm of height adjustment in the upright direction. In another embodiment, the height adjustment bladder assembly 30 provides at 20 mm to 40 mm of height adjustment in the upright direction. The air bladder 40 expands in the upright direction to have a sidewall 46 height between 20 mm and 50 mm. In one embodiment, the air bladder 40 may be a multi-stage bladder to provide various levels of height adjustment associated with each stage. The multi-stage bladder may have multiple chambers in fluid communication for inflating various chambers and providing various height adjustments. The multiple chambers may be generally the same dimensions and have a similar cross-section.

The side wall 46 of the air bladder 40 may be pleated to allow the side wall 46 to compactly fold inward when the air bladder 40 is in a deflated position. The air bladder 40 extends generally the width and length of the frame. In another embodiment, the air bladder 40 extends at least the width and length of the seating surface 18.

A trim cover 50 covers the cushion 32 along the seating surface 18. The trim cover 50 may be attached to move with the cushion 32 as the height is adjusted. In another embodiment, the trim cover may be attached to the frame 34 and include elastically deformable fasters to allow the trim cover to expand as the bladder 40 inflates. The trim cover with elastically deformable fasteners is further described in U.S. patent application Ser. No. 14/569,393 filed on Sep. 29, 2015, the disclosure of which is incorporated in its entirety by reference herein.

The cushion 32 may be made of any suitable comfort foam material, such as a suitable resilient polymer. For example, the cushion layer may be formed of conventional polyurethane foam, soy-based foam, silicone, thermoplastic olefins, thermoplastic urethanes, and/or natural oil-based expanded polyurethanes, soy-based polyurethane, polymer fibers, non-woven polyester pads, and latex foams. The cushion 32 is formed of any suitable comfort material that provides soft resilience during use when an occupant is in a seated position.

The cushion 32 may be formed of multiple foam pieces, such as separate side bolster cushions 54, central cushion 56 and front bolster cushion 58. Alternatively, the cushion may be formed as a single piece so that the side bolsters and front bolsters are connected to the central cushion and formed as one-piece.

Figure 3:
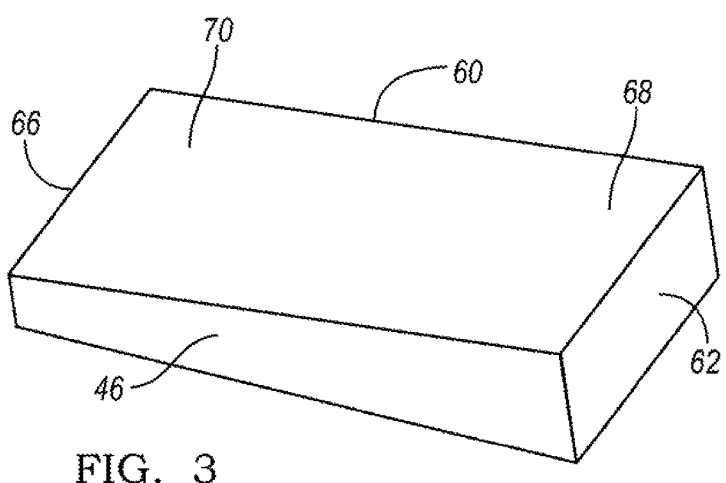
FIG. 3 is a perspective view of an air bladder, according to one embodiment.

FIG. 3 illustrates an air bladder 60 of the height adjustment bladder assembly 30 according to another embodiment. The air bladder 60 has a front wall 62 with a greater height than a rear wall 66. The inflated bladder 60 is wedge shaped, as shown in FIG. 3. (Other shapes that are nonuniform from front to rear could also be used, depending upon the exact requirements for adjustability of the seat cushion.) The wedge-shaped bladder 60 allows a front portion 68 of the bladder 60 to expand to a greater height than a rear portion 70. The wedge-shaped bladder 60 provides proper height adjustment of the seat similar to traditional height adjustment mechanisms. Alternatively, or additionally, another wedge-shaped bladder can be placed on top of the first wedge-shaped bladder; preferably, such additional wedge-shaped bladder would be able to expand to a greater height at a rear portion than at a front portion. Providing two such bladders allows the front and rear of the seat cushion to be independently adjusted upward and downward by suitable inflation/deflation of the two bladders.

The seat assembly 10 also includes compressor 74 provides a source of air to the bladder assembly 30. A seat control module and valve bank are provided on the seat back 14 and identified generally as a controller 76. The controller 76 regulates compressed air into and out of the seat assembly 10. The controller 76 and compressor 74 may be installed in the seat back 14, the seat bottom 12 or installed under the seat, or anywhere suitable in the vehicle.

The controller 76 may communicate with an interface. The interface may be integrated into the vehicle, such as an instrument panel display that is in suitable wired or wireless communication with the controller 76. The interface may be remote, such as a smart device including phones, tablets and the like. The smart device application is further described in U.S. patent application Ser. No. 14/560,487 filed on Dec. 4, 2014, which is incorporated in its entirety by reference herein.

Figure 4:
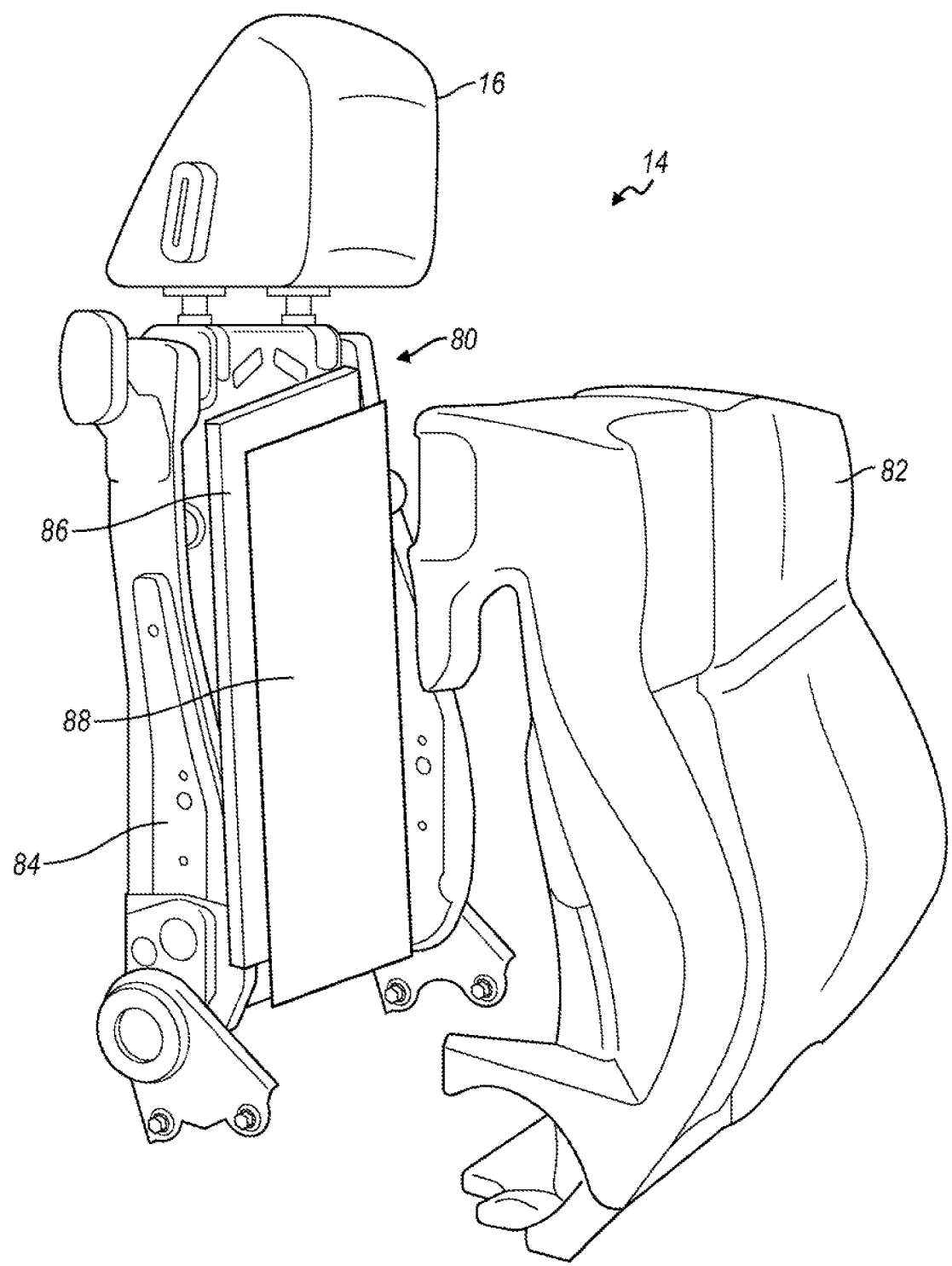
FIG. 4 is an exploded perspective view of the seat back of the seat assembly of FIG. 1, according to an embodiment.

FIG. 4 illustrates an exploded view of the seat back 14 with the trim cover removed. The seat back 14 includes an adjustment bladder assembly 80 positioned under the cushion 82. Similar to the height adjustment assembly 30 of the seat bottom 12, the adjustment bladder assembly 80 is supported upon a frame 84 of the seat back 14 and aids in h-point adjustment of the occupant. The adjustment bladder assembly 80 includes an air bladder 86 and reaction plate 88 that are formed and function similar to the air bladder 40 and reaction plate 42, discussed above. The adjustment bladder assembly 80 allows positioning of the cushion 82 in the fore-aft direction separate from adjustment of the frame 84.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
a seat bottom having a seat frame;
an air bladder mounted to the frame;
a seat cushion spaced vertically from the seat frame by the air bladder at height-adjustment distance being variable, the cushion defining a seating surface; and
a seat back pivotally attached to the seat bottom;
wherein a height-adjustment distance between the frame and the seating surface is increased as the air bladder is inflated, thereby adjusting a height of the seating surface without adjusting the frame, and
wherein the seat back is moved with the cushion by the height-adjustment distance when the air bladder is inflated.

2. The seat assembly of claim 1 further comprising a rigid reaction plate positioned between the air bladder and the seat cushion, wherein the reaction plate is displaced the height-adjustment distance as the air bladder is inflated.

3. The seat assembly of claim 2 wherein the reaction plate extends a length distance being generally equal to a length of the cushion.

4. The seat assembly of claim 3 wherein the air bladder extends the length distance.

5. The seat assembly of claim 2 wherein the reaction plate integrally formed along a lower surface of the cushion.

6. The seat assembly of claim 2 wherein the reaction plate is welded to a top surface of the air bladder.

7. The seat assembly of claim 1 wherein the cushion is moved away from the frame by the height-adjustment distance along a length of the cushion extending from a forward edge to a rearward edge.

8. The seat assembly of claim 6 wherein the air bladder has a wedge shape such that a first portion of the bladder adjacent the rearward edge of the cushion inflates the height-adjustment distance and a second portion of the bladder inflates a second distance being less than the height-adjustment distance.

9. The seat assembly of claim 1 wherein the height-adjustment distance varies by at least twenty millimeters.

10. The seat assembly of claim 1 wherein the height-adjustment distance extends in the range of twenty-five to fitly millimeters.

11. The seat assembly of claim 1 wherein the air bladder comprises a multi-stage bladder having multiple chambers in fluid communication for varying the height-adjustment distance.

12. A seat assembly comprising:
a seat frame;
an air bladder mounted to the frame along a lower surface;
a seat cushion assembly having a central cushion positioned between at least two bolster cushions defining a seating surface, wherein the cushion assembly is positioned on the air bladder along a lower reaction surface being generally rigid,
wherein an adjustment distance between the frame and reaction surface is increased as the air bladder is inflated, thereby adjusting the position of the seating surface without adjusting the frame.

13. The seat assembly of claim 12 further comprising:
a compressor in fluid communication with the air bladder; and
a controller in electrical communication with the compressor and programmed to inflate and deflate the air bladder based on a signal to change the position of the seating surface.

14. The seat assembly of claim 12 wherein the seat frame includes a seat bottom.

15. The seat assembly of claim 12 wherein the seat frame includes a seat back.

16. The seat assembly of claim 12 further comprising a seat bottom and a seat back attached to the seat bottom, wherein the cushion assembly is provided along one of the seat bottom or the seat back, and the other of the seat back or seat bottom is moved with the seat cushion assembly when the air bladder is inflated.

17. A seat assembly comprising:
a seat frame defining a seat bottom and a seat back extending from the seat bottom;

an air bladder mounted to the frame;
a seat cushion assembly provided along one of the seat bottom or the seat back and spaced from the seat frame by the air bladder at an adjustment distance being variable, the cushion assembly defining a seating surface; and
wherein an adjustment distance between the frame and the seating surface is increased as the air bladder is inflated, thereby adjusting the adjustment distance of the seating surface without adjusting the frame, and
wherein the other of the seat back or seat bottom is moved with the cushion assembly by the adjustment distance when the air bladder is inflated.

18. The seat assembly of claim 17 further comprising a rigid reaction plate positioned between the air bladder and the cushion assembly, wherein the reaction plate is displaced by the adjustment distance as the air bladder is inflated.

19. The seat assembly of claim 17 wherein the air bladder comprises a multi-stage bladder having multiple chambers in fluid communication for varying the adjustment distance.

20. The seat assembly of claim 17 wherein the adjustment distance comprises one of a height-adjustment distance of the seat bottom in an upright direction or a fore-aft adjustment distance of the seat back in the fore-aft direction.

* * * * *

UNITED STATES PATENT AND TRADEMARK OFFICE
CERTIFICATE OF CORRECTION

PATENT NO. : 10,232,755 B2
APPLICATION NO. : 15/610061
DATED : March 19, 2019
INVENTOR(S) : Eric Brines et al.

Page 1 of 1

It is certified that error appears in the above-identified patent and that said Letters Patent is hereby corrected as shown below:

In the Claims

Column 6, Lines 30-31, Claim 10:
After "range of twenty-five to"
Delete "fitly" and
Insert -- fifty --.

Column 7, Line 20, Claim 24:
After "varying the adjustment"
Delete "di stance" and
Insert -- distance --.

Signed and Sealed this
Twelfth Day of November, 2019

Andrei Iancu
*Director of the United States Patent and Trademark Office*